US008782261B1

(12) United States Patent
Rodriguez et al.

(10) Patent No.: US 8,782,261 B1
(45) Date of Patent: Jul. 15, 2014

(54) SYSTEM AND METHOD FOR AUTHORIZATION OF SEGMENT BOUNDARY NOTIFICATIONS

(75) Inventors: Arturo A. Rodriguez, Norcross, GA (US); Theodore R. Grevers, Milford, MA (US); Anthony J. Wasilewski, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 12/417,864

(22) Filed: Apr. 3, 2009

(51) Int. Cl.
*G06F 15/16* (2006.01)
*H04H 20/14* (2008.01)

(52) U.S. Cl.
USPC .............. 709/229; 709/217; 709/231; 725/22

(58) Field of Classification Search
USPC .................................. 709/201–207, 217–236
See application file for complete search history.

(56) References Cited

U.S. PATENT DOCUMENTS

| | | | |
|---|---|---|---|
| 5,440,345 | A | 8/1995 | Shimoda |
| 5,606,359 | A | 2/1997 | Youden et al. |
| 5,734,443 | A | 3/1998 | O'Grady |
| 5,734,783 | A | 3/1998 | Shimoda et al. |
| 5,828,370 | A | 10/1998 | Moeller et al. |
| 5,917,830 | A | 6/1999 | Chen et al. |
| 5,917,988 | A | 6/1999 | Eto |
| 5,943,447 | A | 8/1999 | Tkhor et al. |
| 5,949,948 | A | 9/1999 | Krause et al. |
| 5,963,260 | A | 10/1999 | Bakhmutsky |
| 6,160,889 | A | 12/2000 | Yagasaki |
| 6,188,436 | B1 | 2/2001 | Williams et al. |
| 6,201,927 | B1 | 3/2001 | Commer |
| 6,222,979 | B1 | 4/2001 | Willis et al. |
| 6,304,714 | B1 | 10/2001 | Krause et al. |
| 6,393,057 | B1 | 5/2002 | Thoreau et al. |
| 6,421,387 | B1 | 7/2002 | Rhee |
| 6,512,552 | B1 | 1/2003 | Subramanian |
| 6,587,506 | B1 | 7/2003 | Noridomi et al. |
| 6,594,798 | B1 | 7/2003 | Chou et al. |
| 6,643,327 | B1 | 11/2003 | Wang |
| 6,658,199 | B1 | 12/2003 | Hallberg |
| 6,754,373 | B1 | 6/2004 | de Cuetos et al. |

(Continued)

FOREIGN PATENT DOCUMENTS

| | | |
|---|---|---|
| EP | 0 812 112 A2 | 12/1997 |
| EP | 1 292 138 A2 | 3/2003 |

(Continued)

OTHER PUBLICATIONS

Stuhlmuller, Klaus, et al., "Analysis of Video Transmission over Lossy Channels"; IEEE Journal on Selected Areas in Communication, vol. 18, No. 6, Jun. 2000, pp. 1012-1032.

(Continued)

*Primary Examiner* — Yasin Barqadle
(74) *Attorney, Agent, or Firm* — Merchant & Gould

(57) ABSTRACT

Systems and methods for processing segment boundary notifications in a digital media receiver are disclosed. One such method includes the step of registering for notification of segment boundary events associated with a first service provided to the digital media receiver. The method further includes receiving a notification of one of the segment boundary events, while tuned to a second service different than the first service; and tuning to the first service responsive to the received notification.

17 Claims, 9 Drawing Sheets

(56) References Cited

U.S. PATENT DOCUMENTS

| | | | | |
|---|---|---|---|---|
| 6,806,909 | B1 | 10/2004 | Radha et al. | |
| 6,906,743 | B1 | 6/2005 | Maurer | |
| 6,907,075 | B2 | 6/2005 | Felts et al. | |
| 6,909,743 | B1 | 6/2005 | Ward et al. | |
| 6,912,251 | B1 | 6/2005 | Ward et al. | |
| 6,980,594 | B2 | 12/2005 | Wang et al. | |
| 7,027,713 | B1 | 4/2006 | Hallberg | |
| 7,050,603 | B2 | 5/2006 | Rhoads et al. | |
| 7,053,874 | B2 | 5/2006 | Koyama | |
| 7,085,322 | B2 | 8/2006 | Ngai et al. | |
| 7,095,783 | B1 | 8/2006 | Sotheran et al. | |
| 7,096,481 | B1 | 8/2006 | Forecast et al. | |
| 7,129,962 | B1 | 10/2006 | Cote et al. | |
| 7,185,018 | B2 | 2/2007 | Archbold | |
| 7,912,219 | B1 | 5/2007 | Toma et al. | |
| 7,236,520 | B2 | 6/2007 | Kim et al. | |
| 7,243,193 | B2 | 7/2007 | Walmsley | |
| 7,317,839 | B2 | 1/2008 | Holcomb | |
| 7,397,858 | B2 | 7/2008 | Garrido et al. | |
| 7,480,335 | B2 | 1/2009 | Payson | |
| 7,577,198 | B2 | 8/2009 | Holcomb | |
| 7,584,495 | B2 | 9/2009 | Hannuksela et al. | |
| 7,590,180 | B2 | 9/2009 | Kang | |
| 7,599,435 | B2 | 10/2009 | Marpe et al. | |
| 7,599,438 | B2 | 10/2009 | Holcomb | |
| 7,606,308 | B2 | 10/2009 | Holcomb | |
| 7,616,692 | B2 | 11/2009 | Holcomb | |
| 7,620,106 | B2 | 11/2009 | Holcomb | |
| 7,623,574 | B2 | 11/2009 | Holcomb | |
| 7,649,937 | B2 | 1/2010 | Rabenold et al. | |
| 7,656,410 | B2 | 2/2010 | Chiu | |
| 7,733,910 | B2 * | 6/2010 | Mace et al. | 370/473 |
| 7,889,788 | B2 | 2/2011 | Toma et al. | |
| 7,903,743 | B2 | 3/2011 | Ho | |
| 8,136,140 | B2 * | 3/2012 | Hodge | 725/88 |
| 2002/0075402 | A1 | 6/2002 | Robson et al. | |
| 2002/0092017 | A1 | 7/2002 | Klosterman et al. | |
| 2002/0149591 | A1 | 10/2002 | Van Der Vleuten et al. | |
| 2002/0162111 | A1 | 10/2002 | Shimizu et al. | |
| 2002/0176025 | A1 | 11/2002 | Kim | |
| 2002/0178444 | A1 | 11/2002 | Trajkovic et al. | |
| 2003/0012554 | A1 | 1/2003 | Zeidler et al. | |
| 2003/0043847 | A1 | 3/2003 | Haddad | |
| 2003/0072555 | A1 | 4/2003 | Yap et al. | |
| 2003/0081934 | A1 | 5/2003 | Kirmuss | |
| 2003/0093418 | A1 | 5/2003 | Archbold | |
| 2003/0093800 | A1 | 5/2003 | Demas et al. | |
| 2003/0113098 | A1 | 6/2003 | Willis | |
| 2003/0123849 | A1 | 7/2003 | Nallur | |
| 2003/0161407 | A1 | 8/2003 | Murdock et al. | |
| 2003/0189982 | A1 | 10/2003 | MacInnis | |
| 2004/0078186 | A1 | 4/2004 | Nair | |
| 2004/0128578 | A1 | 7/2004 | Jonnalagadda | |
| 2004/0133908 | A1 * | 7/2004 | Smith et al. | 725/31 |
| 2004/0177369 | A1 * | 9/2004 | Akins, III | 725/31 |
| 2004/0179619 | A1 | 9/2004 | Tian et al. | |
| 2004/0210925 | A1 * | 10/2004 | Miyazawa et al. | 725/25 |
| 2004/0218816 | A1 | 11/2004 | Hannuksela | |
| 2005/0002574 | A1 | 1/2005 | Fukuhara et al. | |
| 2005/0013249 | A1 | 1/2005 | Kong et al. | |
| 2005/0022245 | A1 | 1/2005 | Nallur et al. | |
| 2005/0053134 | A1 | 3/2005 | Holcomb | |
| 2005/0053140 | A1 | 3/2005 | Holcomb | |
| 2005/0053141 | A1 | 3/2005 | Holcomb | |
| 2005/0053142 | A1 | 3/2005 | Holcomb | |
| 2005/0053143 | A1 | 3/2005 | Holcomb | |
| 2005/0053144 | A1 | 3/2005 | Holcomb | |
| 2005/0053155 | A1 | 3/2005 | Holcomb | |
| 2005/0053295 | A1 | 3/2005 | Holcomb | |
| 2005/0069212 | A1 | 3/2005 | Bottreau et al. | |
| 2005/0123056 | A1 | 6/2005 | Wang | |
| 2005/0175098 | A1 | 8/2005 | Narasimhan et al. | |
| 2005/0190774 | A1 | 9/2005 | Wiegand | |
| 2005/0207733 | A1 | 9/2005 | Gargi | |
| 2005/0229225 | A1 | 10/2005 | Klausberger et al. | |
| 2006/0013305 | A1 | 1/2006 | Sun | |
| 2006/0036551 | A1 * | 2/2006 | Oliveira et al. | 705/51 |
| 2006/0072597 | A1 | 4/2006 | Hannuksela | |
| 2006/0083298 | A1 | 4/2006 | Wang | |
| 2006/0083311 | A1 | 4/2006 | Winger | |
| 2006/0093045 | A1 | 5/2006 | Anderson et al. | |
| 2006/0093315 | A1 | 5/2006 | Kelly et al. | |
| 2006/0126728 | A1 | 6/2006 | Yu et al. | |
| 2006/0129914 | A1 | 6/2006 | Ellis | |
| 2006/0132822 | A1 | 6/2006 | Walmsley | |
| 2006/0147121 | A1 | 7/2006 | Maeda et al. | |
| 2006/0222319 | A1 | 10/2006 | Russ | |
| 2006/0224763 | A1 | 10/2006 | Altunbasak et al. | |
| 2006/0282319 | A1 * | 12/2006 | Maggio | 705/14 |
| 2006/0294171 | A1 | 12/2006 | Bossen | |
| 2007/0019724 | A1 | 1/2007 | Tourapis | |
| 2007/0030186 | A1 | 2/2007 | Archbold | |
| 2007/0030356 | A1 | 2/2007 | Yea | |
| 2007/0030818 | A1 | 2/2007 | Bahnck et al. | |
| 2007/0031110 | A1 | 2/2007 | Rijckaert | |
| 2007/0038921 | A1 | 2/2007 | Pekonen et al. | |
| 2007/0091997 | A1 | 4/2007 | Fogg et al. | |
| 2007/0106760 | A1 * | 5/2007 | Houh et al. | 709/219 |
| 2007/0109409 | A1 | 5/2007 | Yea | |
| 2007/0112721 | A1 | 5/2007 | Archbold | |
| 2007/0116426 | A1 | 5/2007 | Toma et al. | |
| 2007/0121721 | A1 | 5/2007 | Kim et al. | |
| 2007/0133674 | A1 | 6/2007 | Garnier et al. | |
| 2007/0140358 | A1 | 6/2007 | Schwartz et al. | |
| 2007/0153679 | A1 | 7/2007 | Jost et al. | |
| 2007/0172133 | A1 | 7/2007 | Kim | |
| 2007/0183494 | A1 | 8/2007 | Hannuksela | |
| 2007/0186240 | A1 | 8/2007 | Ward et al. | |
| 2007/0194975 | A1 | 8/2007 | Jang et al. | |
| 2007/0223595 | A1 | 9/2007 | Hannuksela et al. | |
| 2007/0230496 | A1 | 10/2007 | Guo et al. | |
| 2007/0245382 | A1 | 10/2007 | Doi et al. | |
| 2007/0280350 | A1 | 12/2007 | Mathew et al. | |
| 2008/0025399 | A1 | 1/2008 | Le Leannec et al. | |
| 2008/0055463 | A1 | 3/2008 | Lerner | |
| 2008/0056383 | A1 | 3/2008 | Ueki et al. | |
| 2008/0063074 | A1 | 3/2008 | Gallant et al. | |
| 2008/0115175 | A1 | 5/2008 | Rodriguez | |
| 2008/0115176 | A1 | 5/2008 | Rodriguez | |
| 2008/0117985 | A1 | 5/2008 | Chen | |
| 2008/0127255 | A1 * | 5/2008 | Ress et al. | 725/38 |
| 2008/0131079 | A1 | 6/2008 | Toma | |
| 2008/0137742 | A1 | 6/2008 | Chen | |
| 2008/0141091 | A1 | 6/2008 | Kalluri | |
| 2008/0152005 | A1 | 6/2008 | Oguz et al. | |
| 2008/0163308 | A1 | 7/2008 | Kim | |
| 2008/0192817 | A1 | 8/2008 | Llach et al. | |
| 2008/0225850 | A1 | 9/2008 | Oran et al. | |
| 2008/0225951 | A1 | 9/2008 | Young | |
| 2008/0244658 | A1 * | 10/2008 | Chen | 725/50 |
| 2008/0247463 | A1 | 10/2008 | Buttimer | |
| 2008/0256409 | A1 | 10/2008 | Oran et al. | |
| 2008/0260045 | A1 | 10/2008 | Rodriguez et al. | |
| 2008/0311869 | A1 * | 12/2008 | Koga et al. | 455/130 |
| 2008/0320558 | A1 * | 12/2008 | Imanishi et al. | 726/2 |
| 2009/0002379 | A1 | 1/2009 | Baeza | |
| 2009/0003446 | A1 | 1/2009 | Wu | |
| 2009/0003447 | A1 | 1/2009 | Christoffersen | |
| 2009/0028247 | A1 | 1/2009 | Shuh | |
| 2009/0034627 | A1 | 2/2009 | Rodriguez et al. | |
| 2009/0034633 | A1 | 2/2009 | Rodirguez et al. | |
| 2009/0073928 | A1 | 3/2009 | Power | |
| 2009/0100482 | A1 | 4/2009 | Rodriguez et al. | |
| 2009/0103635 | A1 | 4/2009 | Pahalawatta | |
| 2009/0109342 | A1 | 4/2009 | Heng et al. | |
| 2009/0116558 | A1 | 5/2009 | Chen | |
| 2009/0138668 | A1 | 5/2009 | Blankenship | |
| 2009/0141168 | A1 | 6/2009 | Chen et al. | |
| 2009/0148056 | A1 | 6/2009 | Rodriguez et al. | |
| 2009/0148132 | A1 | 6/2009 | Rodriguez et al. | |
| 2009/0154560 | A1 | 6/2009 | Hong | |
| 2009/0154563 | A1 | 6/2009 | Hong | |
| 2009/0161770 | A1 | 6/2009 | Dong | |
| 2009/0180546 | A1 | 7/2009 | Rodriguez et al. | |

(56) References Cited

U.S. PATENT DOCUMENTS

| | | | | |
|---|---|---|---|---|
| 2009/0180547 | A1 | 7/2009 | Rodriguez et al. | |
| 2009/0190655 | A1 | 7/2009 | Shimada | |
| 2009/0190849 | A1 | 7/2009 | Huang | |
| 2009/0199231 | A1* | 8/2009 | Tsuria et al. | 725/32 |
| 2009/0207904 | A1 | 8/2009 | Pandit et al. | |
| 2009/0210412 | A1 | 8/2009 | Oliver | |
| 2009/0214178 | A1 | 8/2009 | Takahashi | |
| 2009/0220012 | A1 | 9/2009 | Rodriguez et al. | |
| 2009/0226105 | A1 | 9/2009 | Huang | |
| 2009/0262804 | A1 | 10/2009 | Pandit | |
| 2009/0279608 | A1 | 11/2009 | Jeon | |
| 2009/0296811 | A1 | 12/2009 | Jeon | |
| 2009/0310934 | A1 | 12/2009 | Rodriguez | |
| 2009/0313662 | A1 | 12/2009 | Rodriguez | |
| 2009/0313668 | A1 | 12/2009 | Shepherd | |
| 2009/0323822 | A1 | 12/2009 | Rodriguez | |
| 2010/0003015 | A1 | 1/2010 | Rodriguez | |
| 2010/0020870 | A1 | 1/2010 | Jeon | |
| 2010/0026882 | A1 | 2/2010 | Jeon | |
| 2010/0026883 | A1 | 2/2010 | Jeon | |
| 2010/0026884 | A1 | 2/2010 | Jeon | |
| 2010/0027417 | A1 | 2/2010 | Franceschini et al. | |
| 2010/0027653 | A1 | 2/2010 | Jeon | |
| 2010/0027654 | A1 | 2/2010 | Jeon | |
| 2010/0027659 | A1 | 2/2010 | Jeon | |
| 2010/0027660 | A1 | 2/2010 | Jeon | |
| 2010/0027667 | A1 | 2/2010 | Samuelsson et al. | |
| 2010/0027682 | A1 | 2/2010 | Jeon | |
| 2010/0074340 | A1 | 3/2010 | Luo et al. | |
| 2010/0088717 | A1* | 4/2010 | Candelore et al. | 725/32 |
| 2010/0118973 | A1 | 5/2010 | Rodriguez et al. | |
| 2010/0118974 | A1 | 5/2010 | Rodriguez et al. | |
| 2010/0118978 | A1 | 5/2010 | Rodriguez et al. | |
| 2010/0118979 | A1 | 5/2010 | Rodriguez et al. | |
| 2010/0122311 | A1 | 5/2010 | Rodriguez et al. | |
| 2010/0150527 | A1* | 6/2010 | Sandoval | 386/83 |
| 2010/0215338 | A1 | 8/2010 | Rodriguez | |
| 2010/0218232 | A1 | 8/2010 | Rodriguez | |
| 2010/0241753 | A1* | 9/2010 | Garbajs et al. | 709/227 |
| 2010/0293571 | A1 | 11/2010 | Rodriguez | |
| 2010/0322302 | A1 | 12/2010 | Rodriguez | |
| 2011/0222837 | A1 | 9/2011 | Walton et al. | |

FOREIGN PATENT DOCUMENTS

| | | | |
|---|---|---|---|
| EP | 1 328 119 | A1 | 7/2003 |
| JP | 05-236465 | A | 9/1993 |
| KR | 10-2004-0054708 | | 6/2004 |
| WO | WO 00/00981 | A2 | 1/2000 |
| WO | WO 00/62552 | A2 | 10/2000 |
| WO | 01/43440 | | 6/2001 |
| WO | 01/63774 | | 8/2001 |
| WO | WO 2004/102571 | A1 | 11/2004 |
| WO | WO 2005/106875 | A1 | 11/2005 |
| WO | WO 2006/083824 | A2 | 8/2006 |
| WO | 2006/101979 | | 9/2006 |
| WO | WO 2006/114761 | A1 | 11/2006 |
| WO | WO 2008/063881 | A2 | 5/2008 |
| WO | WO 2009/018360 | A1 | 2/2009 |
| WO | WO 2009/052262 | A2 | 4/2009 |

OTHER PUBLICATIONS

PCT Search Report cited in International Appln No. PCT/US2009/064180 mailed Jan. 8, 2010.

PCT Written Opinion cited in International Appln No. PCT/US2009/064180 mailed Jan. 8, 2010.

PCT Search Report cited in International Appln No. PCT/US2009/047521 mailed Dec. 22, 2009.

PCT Written Opinion cited in International Appln No. PCT/US2009/047521 mailed Dec. 22, 2009.

European Examination dated Sep. 16, 2010 in Application No. 08 796 875.6.

U.S. Non-Final Office Action in U.S. Appl. No. 11/627,452 dated Nov. 10, 2010.

U.S. Non-Final Office Action in U.S. Appl. No. 11/831,916 dated Aug. 4, 2010.

Canadian Office Action dated Dec. 11, 2009 in Application No. 2,533,169.

U.S. Appl. No. 12/709,851, filed Feb. 22, 2010 entitled "Signalling of Decodable Sub-Sequences", Inventor: Arturo A. Rodriguez.

U.S. Appl. No. 12/713,153, filed Feb. 25, 2010 entitled "Signalling of Auxiliary Information that Assists Processing of Video According to Various Formats", Inventors: Rodriguez et al.

U.S. Appl. No. 12/722,117, filed Mar. 11, 2010 entitled "Management of Picture Referencing in Video Streams for Plural Playback Modes", Inventors: Walton et al.

Hurst et al., "MPEG Splicing Tutorial and Proposed SMPTE Standard", Proceedings of the SMPTE Technical Conference, Nov. 1997, pp. 105-117.

International Preliminary Report on Patentability and Written Opinion dated Feb. 2, 2010 cited in International Application No. PCT/US2008/071111.

U.S. Non-Final Office Action dated Feb. 1, 2010 in U.S. Appl. No. 11/831,916.

International Search Report and Written Opinion dated Apr. 15, 2010 cited in International Application No. PCT/US2010/024927.

European Examination dated May 4, 2010 in Application No. 07 844 937.8.

U.S. Appl. No. 12/779,035, filed May 12, 2010 entitled "Signalling Buffer Characteristics for Splicing Operations of Video Streams", Inventors: Rodriguez et al.

U.S. Appl. No. 12/492,117, filed Jun. 25, 2009, entitled "Support for Blocking Trick Mode Operations."

U.S. Appl. No. 12/483,925, filed Jun. 12, 2009, entitled "Picture Interdependencies Signals in Context of MMCO to Assist Stream Manipulation."

U.S. Appl. No. 12/417,868, filed Apr. 3, 2009, entitled "Segment Boundary Notification to a Digital Media Receiver."

U.S. Appl. No. 12/417,869, filed Apr. 3, 2009 entitled "System and Method for Processing Segment Boundary Notifications."

ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.

Tian et al., "Sub-Sequence Video Coding for Improved Temporal Scalability", 4 pages.

Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.

Amon et al., "File Format for Scalable Video Coding", IEEE Transactions on Circuits and Systems for Video Technology, vol. 17 No. 9, Sep. 2007, pp. 1174-1185.

ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-1_PDF_E.pdf, XP007905991, pp. 1-76.

MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.

"Splice Points for MPEG-2 Transport Streams", SMPTE Journal, SMPTE Inc., vol. 107 No. Oct. 1998, XP-000793004, pp. 916-925.

Rodriguez et al., "SEI message to convey suitable splice points in the bitstream", JVT Meeting, Document JVT-Z040, Filename JVT-Z040.doc, XP-30007329, Jan. 2008, pp. 1-8.

Luo et al., "On HRD conformance for splice bitstreams", JVT Meeting, Document JVT-V055r1, Filename JVT-V055r1.doc, XP-30006863, Jan. 2007, pp. 1-11.

International Search Report dated Sep. 4, 2009 cited in International Application No. PCT/US2009/047237.

(56) References Cited

OTHER PUBLICATIONS

Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 6, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Non-Final Office Action mailed Aug. 5, 2011 in U.S. Appl. No. 11/831,906.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. No. 11/831,912.
U.S. Final Office Action mailed Sep. 28, 2011 in U.S. Appl. No. 11/831,916.
U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2011 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
U.S. Non-Final Office Action mailed Jan. 10, 2012 in U.S. Appl. No. 12/333,301.
U.S. Non-Final Office Action mailed Jan. 18, 2012 in U.S. Appl. No. 12/617,015.
U.S. Final Office Action mailed Jan. 19, 2012 in U.S. Appl. No. 12/124,779.
U.S. Final Office Action mailed Feb. 17, 2012 in U.S. Appl. No. 11/627,452.
U.S. Final Office Action mailed Jan. 2, 2014 in U.S. Appl. No. 12/483,925, 47 pages.
U.S. Final Office Action mailed Jan. 16, 2014 in U.S. Appl. No. 12/333,296, 18 pages.
U.S. Final Office Action mailed Jan. 27, 2014 in U.S. Appl. No. 12/492,117, 23 pages.
U.S. Non-Final Office Action mailed Jan. 29, 2014 in U.S. Appl. No. 12/252,632, 22 pages.
U.S. Final Office Action mailed Jan. 30, 2014 in U.S. Appl. No. 12/722,117, 22 pages.
U.S. Office Action mailed Feb. 10, 2014 in U.S. Appl. No. 12/713,153, 18 pages.
U.S. Office Action mailed Feb. 13, 2014 in U.S. Appl. No. 13/633,672, 5 pages.
U.S. Office Action mailed Mar. 21, 2014 in U.S. Appl. No. 11/831,906, 20 pages.
U.S. Office Action mailed Mar. 28, 2014 in U.S. Appl. No. 12/417,869, 12 pages.

* cited by examiner

SYSTEM AND METHOD FOR AUTHORIZATION OF SEGMENT BOUNDARY NOTIFICATIONS

CROSS REFERENCE TO RELATED APPLICATIONS

Not applicable.

FIELD OF THE DISCLOSURE

The present disclosure relates to digital media delivery, and more specifically, to systems and methods of notifying digital media receivers about segment boundaries in media streams.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). With so many services to choose from, a typical viewing pattern involves a lot of switching from one service to another, a behavior commonly known as "channel surfing". For example, while watching a one-hour broadcast program, a viewer might periodically switch to a sporting event to check for the current score, then switch back to resume viewing of the previous program.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Overview

Embodiments are disclosed herein that provide systems, devices, and methods of authorizing segment boundary notifications. One such method is performed in a digital media receiver and includes registering for notification of segment boundary events associated with a first service provided to the digital media receiver. The method also includes receiving a notification of one of the segment boundary events while tuned to a second service different than the first service. The method also includes determining whether the notification is authorized, processing the notification responsive to the determination that the authorization is authorized.

One such device is a digital media receiver including logic configured to register for notification of segment boundary events associated with a first service provided to the digital media receiver. The digital media receiver also includes logic configured to receive a notification of one of the segment boundary events while tuned to a second service different than the first service. The digital media receiver also includes logic configured to determine whether the notification is authorized. The digital media receiver also includes logic configured to process the notification, responsive to the determination that the authorization is authorized.

One such device is a digital media receiver including memory and a processor. The processor is configured by instructions retrieved from the memory to receive, during an authorization process, a key associated with segment boundary event notification. The processor is also configured to register for notification of segment boundary events associated with a first one of the subset of services. The processor is also configured to receive an encrypted notification of one of the segment boundary events while the digital media receiver is tuned to a second one of the subset of services, the second one being different than the first one. The processor is also configured to decrypt the encrypted notification using the received key, and to process the decrypted notification.

Example Embodiments

Figure 1:
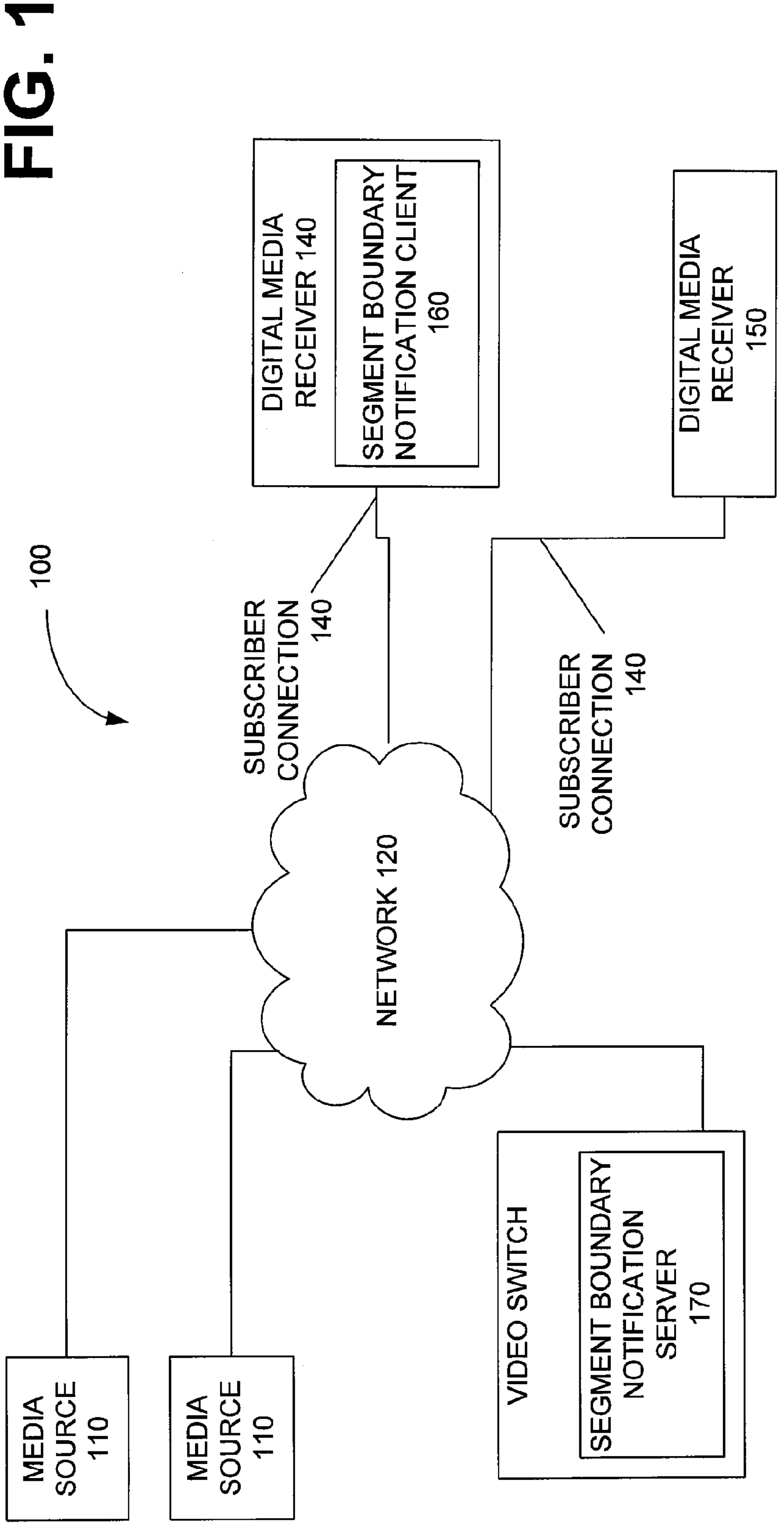
FIG. 1 is a block diagram of one embodiment of a system and method for providing and processing segment boundary notifications.

FIG. 1 is a block diagram of an environment in which one embodiment of a system and method for segment boundary notification is located. System 100 delivers various digital television services to subscribers, which may include television programming, video-on-demand, pay-per-view, music, Internet access, shopping, and telephone. These television services are delivered in a transport stream containing one or more multiplexed video programs, the emissions respectively corresponding to the television services), where each video program contains one or more multiplexed media streams in the transport stream. These television services may be provided from various sources. One such source is a media source 110, which provides or transmits encoded media content in, for instance, a cable television network, a television services network, or originally from a broadcast television station. Other sources of media content or television services should be familiar to a person of ordinary skill in the art, and are intended to be within the scope of this disclosure. Throughout this specification, media content should be understood to be a video program or any other form of media that includes one or more media streams, such as audio, video, or graphics streams. Likewise, it should be understood that a video program is associated with and comprises a set of one or more media streams that may or may not have a video stream.

Various media content sources may be located at a facility known as a "head end" which is operated by a television services provider (e.g., a network operator) that also operates television network 120. Media source 110 and video switch 170 may be part of the television network 120. However, these components are not limited to residing at that location.

Common encoding formats for the video stream of a video program or media content may include MPEG-2 video, MPEG-4 AVC, -or SMPTE VC-1, but others are contemplated to be within the scope of this disclosure. In some environments, a transport stream may include one or more multiplexed video programs, with each video program containing one or more corresponding encoded media streams that are multiplexed in the transport stream. A video program, such as one provided by a television service, contains a video elementary stream and an audio elementary stream multiplexed together into the transport stream. In some embodiments, the transport stream, such as the MPEG-2 Transport Stream, may comprise of a single video program in the transport stream, which herein we refer to as a single program transport stream (SPTS).

MPEG-2 Transport Stream in specified by ISO 13818-1 MPEG-2 Systems, and is also known as ITU-T H222.0 (05/2006). The packetized elementary stream (PES) that corresponds to the video stream of a video program is carried in transport packets identifiable by a packet identifier (PID).

The concepts described herein apply to various types of elementary stream encapsulations, including (but not limited to): PES in MPEG-2 Transport Stream (TS); MPEG-2 Elementary Stream (ES) over UDP/IP, RTP/UDP/IP or RTP/TCP/IP; MPEG-2 PES over UDP/IP, RTP/UDP/IP or RTP/TCP/IP; PES in MPEG-2 TS over UDP/IP, RTP/UDP/IP and RTP/TCP/IP. Thus, all references herein to MPEG-2 as a transport apply equally to an alternate transport mechanism or layer such as IP or RTP.

Media content or video programs of television services, from various sources, are provided over network 120 to digital media receivers, which are also referred to herein as digital media receivers. In one embodiment, the media content or video programs of television services are provided via a video switch 130. In some embodiments, video switch 130 is connected to the input of other network processing devices (e.g., a multiplexer, a QAM channel modulator, etc.). In some embodiment, a subset of the television services are provided for a particular group of subscribers, and the corresponding subset of video programs, each having one or more multiplexed media streams, is delivered to those subscribers connected to video switch 130, via subscriber connections 140. Each of these video programs can be viewed as providing a particular television service to a subscriber. Other embodiments do not use video switch 130. In these embodiments, instead of multiple video programs provided by video switch 130, only a single video program is provided at a time, corresponding to a particular television service.

A digital media receiver 150 receives, via subscriber connection 140, the subset of video programs that correspond to the television services selected by video switch 130. Digital media receiver 150 then selects one or more of the delivered television services for presentation to a user. (This selection is sometimes referred to as "tuning".) In some embodiments, digital media receiver 150 processes the one or more multiplexed media streams corresponding to the video program of the selected television service and converts them into a presentable or output form, such as a video signal, either in analog form or digital form. Processing may comprise of decompression and reconstruction of the pictures in a received video stream. This video signal is supplied to a display (e.g., a television or computer monitor) for viewing by a subscriber. In some embodiments digital media receiver 150 stores the video program of the selected television service for later presentation (e.g., digital video recorder or DVR).

A particular television service provides different video programs at different times. These video programs can include conventional "television programs", movies, sporting events, etc. The media content carried in a particular television service can also be viewed as containing sequential segments which are non-overlapping. Two consecutive segments are divided by a boundary that includes the end of the first of the two consecutive segments followed by the beginning of the second segment. Several examples of boundaries and segments will now be discussed.

One example is a boundary between two scheduled video programs: a video program (e.g., "Friends") from 8 PM to 9 PM and another video program ("Monday Night Football") from 9 PM to 11 PM, with a program boundary between the two. Another example is a scheduled boundary within a video program (e.g., between the end of a portion of a program and the start of an advertisement). As yet another example, the transmission of a television service can be divided into multiple segments, with unscheduled boundaries in between, determined in real-time (e.g., rounds of a boxing match, quarters of a basketball game, etc.). An unscheduled boundary corresponds to a segment boundary that is determined as a video program progresses through time. Alternatively or additionally, an unscheduled boundary corresponds to a segment boundary that is determined as events in a video program are reached through time, such as a "time-out" or half time in a live basketball game.

Segment boundaries can be context-specific: e.g., for a conventional video program (also referred to herein as a television program), segments may be scenes or chapters and; for a sporting event, segments may correspond to quarters/halves, score highlights, half-time presentations, etc. Yet another example is a boundary between a video program (or a program chapter) and an advertisement.

Using techniques disclosed herein, a subscriber requests to be notified of the occurrence of a segment boundary for a particular service (i.e., a segment boundary event). Using the examples mentioned earlier, a subscriber might request notification at the start of the next program that is carried on one service/channel, or at the start of the fourth quarter of a sporting event that is carried on another service/channel.

Segment boundaries are not based on time or a clock, but rather on a signal or message in the transport layer corresponding to the first service (or of the current video program of the first service) that identifies the segment boundary. For example, a message is included in the transport layer, such as in the Adaptation Field of an MPEG-2 Transport packet.

Furthermore, a segment boundary notification is not a notification for an event that is based on any of the following or any combination of the following: program guide data, any information obtained from a program guide's database; a program's title, start time or end time; information pertaining to a program that is provided separate from the one or more multiplexed media streams of the video program; information provided at a different time when providing the video program (the one or more multiplexed media streams thereof) since a signal or message that identifies the segment boundary of the video program is provided with the video program. As described previously, a segment boundary notification corresponds to a boundary that includes the end of the first of two consecutive segments followed by the beginning of the second segment (rather than just the beginning of the second segment).

In one embodiment, a segment boundary notification corresponds to a notification of a transition from one type of information provided by a particular television service to another type of information provided by the particular television service. As a non-limiting example, a first type of information may be a non-live sports program, such as a sports documentary, and a second type of information may be a live sports program or event, such as a basketball game. A first television service may be a broadcast television channel that carries scheduled video programs, such as NBC. A second television service may be a video on demand service. A third television service may correspond to a pay per view service.

In one embodiment, a segment boundary notification corresponds only to signaling a specific type of transition: e.g., a transition from a first type of information provided by the particular television service to a second type of information provided by the particular television service.

In an alternate embodiment, a segment boundary notification corresponds only to signaling a transition from a first type of information to a second type of information provided by the particular television service, or to a transition from the second type of information to the first type of information in the television service.

In yet another embodiment, a segment boundary notification corresponds to signaling any transition from one type of information to another and different type of information provided by the particular television service, regardless of the types of information involving the transition.

In an alternate embodiment, a segment boundary notification corresponds to a particular type of transition from plural types of transitions. In such a case, a boundary event notification includes information corresponding to a transition type, such as but not limited to a transition type data field. Predetermined or designated values carried in the transition type data corresponds to the type of transition being notified by the segment boundary notification.

In one embodiment, digital media receiver 150 is configured to examine auxiliary information provided with a received video program. This auxiliary information herein is called segment boundary information (SBI) or equivalently a segment boundary notify message (SBNM). The SBI includes a "segment boundary" data field (SBDF) having a value. A first value of the SBDF corresponds to a segment boundary notification. A second value different than the first SBDF value does not notify or identify a segment boundary. Alternatively, a second value different than the first SBDF value notifies or identifies the absence of a segment boundary notification. Digital media receiver 150 determines the presence of a segment boundary notification when the value of the SBDF equals the first value.

The SBI is provided or received unscrambled, even if the corresponding video program is provided or received scrambled. In one embodiment, the SBI is provided as private data in the adaptation field of an MPEG-2 transport packet. The header and adaptation field of MPEG-2 transport packets are always unscrambled.

The SBI is associated with a segment boundary by the relative location of the SBI in the transport stream to the segment boundary or portions thereof. In one embodiment, the SBI is provided in the transport packet containing in its payload the segment boundary. That is, the transport packet's payload contains both: (1) the end of a first segment, and (2) the start of a second segment that immediately follows the first segment.

In another embodiment, the SBI is provided in the transport packet containing in its payload only a portion of the boundary: the start of the second segment that immediately follows the first segment, but not the end of the first segment.

In yet another embodiment, the SBI is provided in the transport packet containing in its payload the end of the first segment but not the start of the second segment that immediately follows the first segment.

In one embodiment, the SBI also includes a "location" data field (LDF) that identifies the location of the segment boundary or portions thereof. The value of the LDF, N, represents the number of pictures, frames or fields in the video stream away from the current location of the SBI, where the segment boundary (or portion thereof depending on the embodiment) is located. Digital media receiver 150 finds segment boundary (or portion thereof) by counting the number of start codes in the corresponding video stream that are encountered after the SBI. In other words, digital media receiver 150 detects the succeeding start codes in the PES containing the corresponding video stream to find the segment boundary.

Alternatively, digital media receiver 150 finds the segment boundary (or portion thereof) by counting the number of instances that the payload_unit_start_indicator (PUSI) in the MPEG-2 transport packet's header equals one. In accordance with MPEG-2 Transport, the transport packet containing the first byte of a PES packet in its payload must have PUSI flag set equal to one. In this embodiment, each PES packet of the video stream contains only one picture, frame, or field.

According to the value of N, the segment boundary may or may not be included in the payload of the transport packet containing the SBI. For instance, when N equals zero, the transport packet includes in its payload the notified segment boundary (or portion thereof).

In one embodiment, a segment boundary notification is provided unencrypted in the transport stream carrying the video program of the particular television service. In an alternate embodiment, the segment boundary notification is provided encrypted. For the latter case, a first digital media receiver in a television services network may be authorized to process a segment boundary notification, whereas a second digital media receiver in the same network may receive the same one or more segment boundary notifications received by the first digital media receiver, but not be authorized to process them. Hence, the first digital media receiver is provisioned a priori with one or more keys necessary to decrypt encrypted segment boundary notifications, while the second digital media receiver is not provisioned with such keys. The necessary keys may be transmitted to the first set top box during an authorization (or provisioning) phase. The first digital media receiver may process one or more segment boundary notifications after being authorized or provisioned with the keys.

In one embodiment, a digital media receiver may be authorized to process segment boundary notifications corresponding respectively to a first subset of the plural transition types (i.e., types of transitions). The first subset of plural transition types authorized for a set-top may be configured during the authorization phase. In another embodiment, a digital media receiver may be authorized to process received segment boundary notifications corresponding to transitions provided in a first set of respective television services and not for the received segment boundary notifications corresponding to transitions in a second set of respective television services. The first and second sets of television services may or may not comprise the complete set of television services offered to a viewer or subscriber via the digital media receiver. A complete set of television services may be the entire line-up of television channels offered to a subscriber via the digital media receiver.

In one embodiment, the first set of respective television services for which a digital media receiver may be authorized to process event boundary notifications may correspond to television services for which a subscriber pays an extra fee to be authorized to view (i.e., receive and decrypt the respective television services in the first set). The extra fee is typically paid by the subscriber to the television services provider that operates the television network. As a non-limiting example, the first set of respective television services may include premium television channels or services, such as HBO and Cinemax. The second set of respective television services for which a digital media receiver may not be authorized to process event boundary notifications may include television channels or services (e.g., ABC, NBC, CBS and FOX) that the subscriber is authorized to view without paying the extra fee. The extra fee means a monetary amount beyond the monetary amount, if any, that the subscriber would be required to pay to be authorized to view the second set of respective television services.

In another embodiment, the first set of respective television services for which a digital media receiver may be authorized to process event boundary notifications may correspond to television services for which a subscriber does not pay an extra fee to be authorized to view (i.e., receive and decrypt the respective television services in the first set). An extra fee is typically paid by the subscriber to the television services provider that operates the television network to be authorized to view a second set of television services, such as HBO and Cinemax. As a non-limiting example, the first set of respective television services may include premium television channels or services, such as HBO and Cinemax. The second set of respective television services for which a digital media receiver may be authorized to process event boundary notifications may include television channels (e.g., ABC, NBC, CBS and FOX) that the subscriber is authorized to view without paying the extra fee.

In one embodiment, a subscriber is allowed to process event boundary notifications only for an additional fee to the television services provider that operates the television network.

A segment boundary notification may signal a first type of transition corresponding to a transition from a first type of visual information (i.e., first type of information) to a second type of visual information (i.e., a second type of information). For instance, a first type of transition may correspond to a transition from a commercial or advertisement to the video program being currently broadcast on a particular television channel. A segment boundary notification may also correspond to a transition from the video program to the commercial in the particular television channel.

A segment boundary notification may signal a transition from a first song to a second song in a music television channel. Hence, a segment boundary notification may correspond to a transition from a first audio content to a second audio content. Furthermore, information about the titles or when the scheduled transition occurs is not included in program guide information provided to the digital media receiver 150.

In one embodiment, digital media receiver 150 is configured for boundary segment notifications and not configured to receive and provide program guide data.

Referring back to FIG. 1, requests for segment boundary notifications are generated by segment boundary notification client module 160 in digital media receiver 150 and sent to a segment boundary notification server module 170 that is associated with video switch 130. The high-level interaction between these two modules will be discussed in connection with FIG. 2, then more details will be discussed in connection with FIGS. 3-6. In the embodiment shown in FIG. 1, server module 170 is integrated into video switch 130. In other embodiments, server module 170 is a separate component. In still other embodiments, server module 170 is integrated into a different head-end component. Persons of ordinary skill in the art should appreciate that the functionality of server module 170 distributed in other ways and among other components as well.

Figure 2:
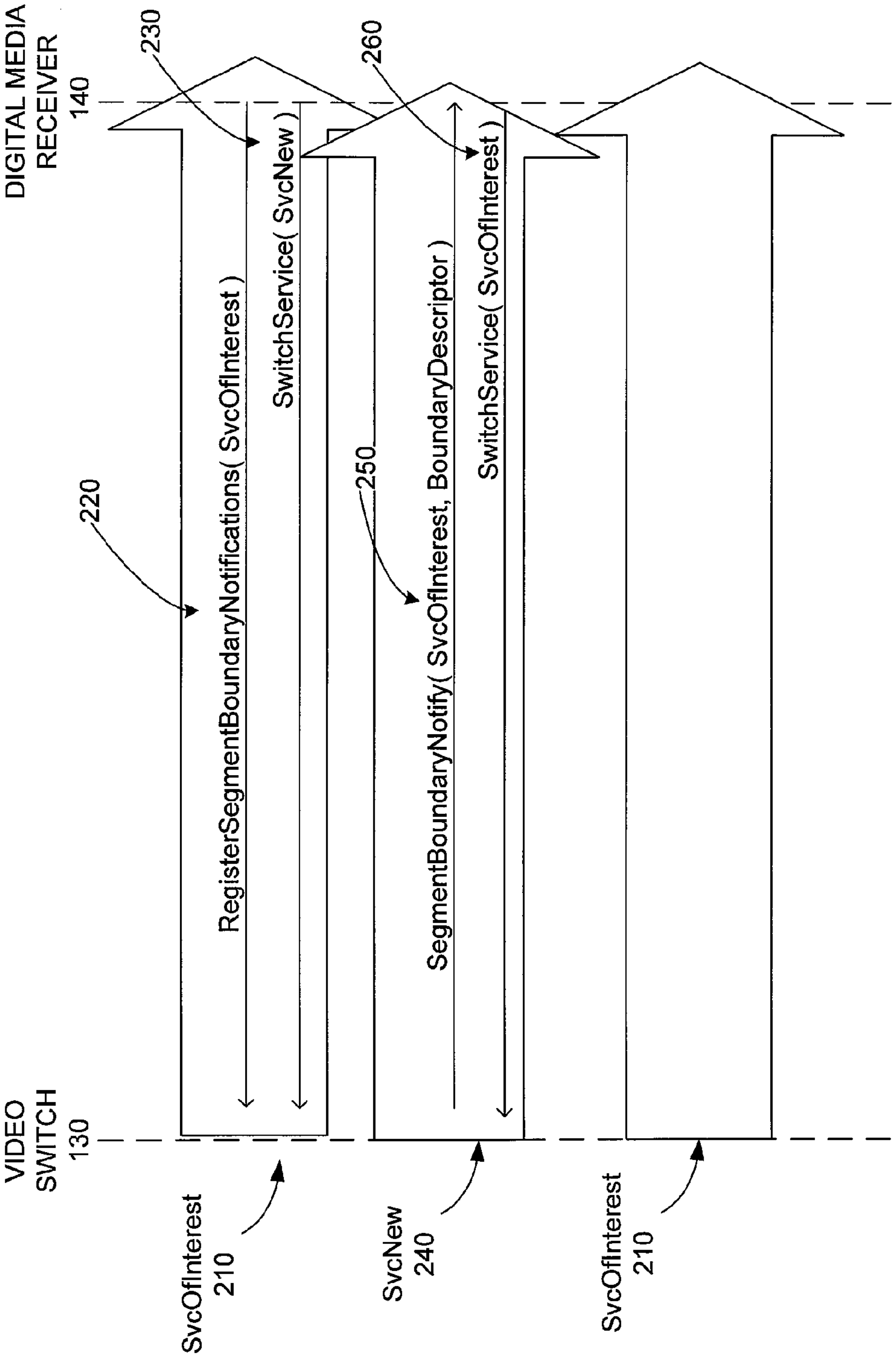
FIG. 2 is a diagram illustrating some aspects of communication between the video switch and the digital media receiver from FIG. 1, during the segment boundary notification process.

FIG. 2 is a diagram illustrating some aspects of communication between video switch 130 and digital media receiver 150 during the segment boundary notification process. Video switch 130 appears on the left side of the diagram while digital media receiver 150 appears on the right, with time increasing from top to bottom. Delivery of services is represented with wide arrows and control messages are represented with thin arrows. A control message that is sent while a service is being delivered is shown as a thin arrow superimposed on a wide arrow.

In the example of FIG. 2, digital media receiver 150 is initially receiving a service (SvcOfInterest 210). While receiving SvcOfInterest 210, digital media receiver 150 sends a request (220) to register for segment boundary notifications for SvcOfInterest 210. In some embodiments, this request is initiated by a user action (e.g., a menu selection, a key, sequence of keys, button, or sequence of buttons on a remote control, etc.). In other embodiments, rather than selecting the function from a displayed menu or screen, the user enters information with the input device, where the entered information corresponds to the function (to return to the first service at a segment boundary), and/or to a specific type of segment boundary.

Video switch 130 receives the registration request 220 and processes it (not shown). While still receiving SvcOfInterest 210, digital media receiver 150 sends a request (230) to switch to a different service (e.g., a channel change request). In response to the switch service request 230, video switch 130 delivers the newly requested service (SvcNew 240). In summary, the actions described so far correspond to the following example scenario: user is watching a program on FOX; user requests notification when the program on FOX resumes after an advertisement; user switches to another service, such as an electronic program guide (EPG) service, instead of FOX.

While receiving SvcNew 240, video switch 130 sends a SegmentBoundaryNotify message (250), or SBNM, which includes information about the segment boundary and about the associated service/program. The SBNM includes the location of the boundary in the media stream (e.g, in the video stream of the video program). (Details of the segment boundary information will be discussed later in connection with FIGS. 4 and 5.) Digital media receiver 150 processes the SegmentBoundaryNotify message 250—which may include notifying the user—and in response sends a request (260) to switch back to the initial service 210 (the one associated with the notification and thus with the segment boundary). In summary, this next set of actions corresponds to the following example scenario: while the user is viewing the EPG service, video switch 130 detects an imminent return from advertisement on FOX and notifies digital media receiver 150 about this segment boundary; digital media receiver 150 notifies the user that the program on FOX is about to resume; user switches back to FOX.

Importantly, video switch 130 sends the segment boundary notification, via the segment notification control message (SBNM) 250, before the segment boundary occurs in the program stream. The lead time, which is determined a priori, is sufficient to allow the digital media receiver 150 enough time to process the notification 250 and to change the channel/service (message 260) back to the original program 210. The lead time between segment boundary notification and the actual segment boundary in the program stream depends on a number of factors including but not limited to the bit-rate of the video program, number of programs delivered simultaneously, the processing capabilities of digital media receiver 150, the estimated channel acquisition time of digital media receiver 150.

Figure 3:
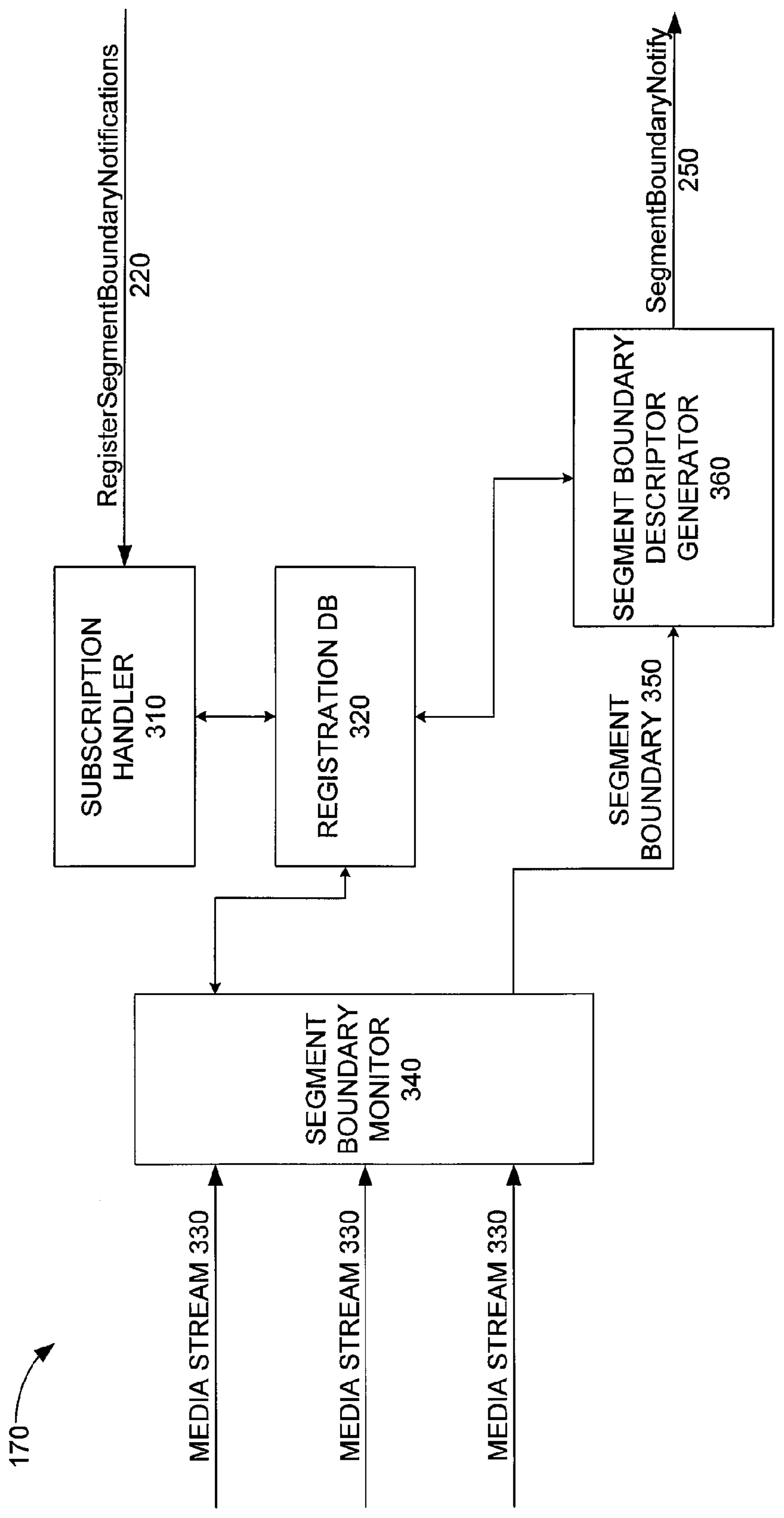
FIG. 3 is a block diagram of selected components of the segment boundary notification server module, according to one embodiment of the system from FIG. 1.

FIG. 3 is a block diagram of selected components of segment boundary notification server module 170 in one embodiment. A subscription handler 310 receives subscription requests 220 (for segment boundary notification) over an upstream control channel, and stores an identifier of the requesting digital media receiver 150 into registration database 320, along with the service/channel for which notifications are requested. (Although the term "database" is used here, a true database is not required—any mechanism for storing and retrieving records will do.) Multiple video programs 330, each comprising of one or more media streams, also known as "video feeds" and each corresponding to a television service, are received and processed by a segment boundary monitor 340. Segment boundary monitor 340 uses registration database 320 to determine which video programs are of interest to subscribers, and then for those video programs, examines their corresponding one or more media streams 330 to find segment boundaries. In some embodiments, the segment boundaries in incoming streams 330 that correspond to one or more type of transitions may be determined from digital program insertion (DPI) events. Upon the determining or detection of a segment boundary 350 in a stream-of-interest, segment boundary descriptor (SBD) generator 360 obtains the identifier of the registered digital media receiver 150 from registration database 320, and generates a SegmentBoundaryNotify message 250. This message 250 is then sent to the digital media receiver 150 via a downstream control channel.

Figure 4:
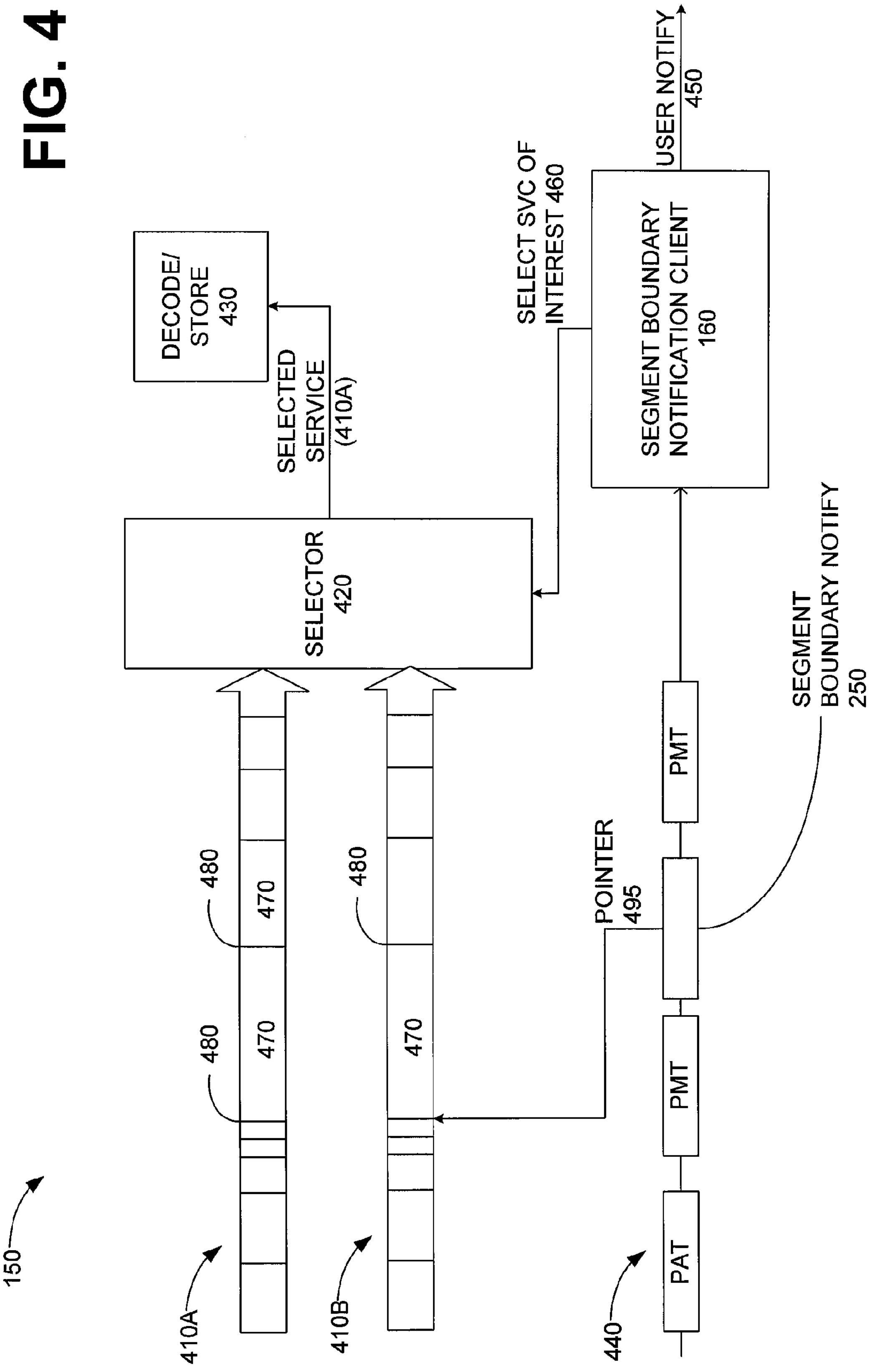
FIG. 4 is a block diagram of a segment boundary notification client module and various other components in one embodiment of the digital media receiver from FIG. 1.

FIG. 4 is a block diagram of segment boundary notification client module 160 and various other components in one embodiment of digital media receiver 150. Digital media receiver 150 receives one or more video programs (410) or television services concurrently, and selector 420 chooses one of the video programs for decoding and/or storage (block 430). In the example of FIG. 4, two video programs are received (410A and 410B), and program 410A is selected by selector 420. This selection process may sometimes be referred to as "tuning", so that the selected service corresponds to the "currently tuned" service. In some cases, the user may choose the currently tuned service (e.g., by switching channels), but in other cases, the digital media receiver 150 itself chooses the currently tuned service (e.g., a scheduled recording).

Video programs are depicted here as separate logical entities. In some embodiments, the video programs are all carried in a SPTS. The MPEG-2 transport packets carrying the one or multiplexed media streams corresponding to a selected video program are identifiable by their corresponding PIDS. (See FIG. 5.) In such embodiments, selector 420 filters by PID, such that PIDs corresponding to the one or more media streams (e.g., video, audio, and/or data) of the currently tuned video program are received, processed (e.g., decoded) for viewing and/or stored for later viewing. In other embodiments, each video program 410 is carried in a separate RTP/RTCP stream, and selector 420 selects by RTP stream identifier.

In one embodiment, digital media receiver 150 may receive information on a control channel (440). In some embodiments, control channel 440 carries information such as a program information table (PAT), a program map table (PMT), a conditional access table (CAT), a network information table (NIT), a service description table (DST) and a time and date table (TDT). In an alternate embodiment, in accordance with MPEG-2 Systems, these tables are provided within the MPEG-2 Transport stream (or layer) containing the one or more multiplexed media streams of the video program. As shown in FIG. 4, SegmentBoundaryNotify message 250 (also shown in FIG. 2) is received on control channel 440, and provided to segment boundary notification client module 160 (see FIG. 1). After identifying the service to which the boundary notification applies, and the location of the segment boundary within that service, client module 160 notifies the viewer of the upcoming segment boundary (event 450) and/or instructs (event 460) selector 420 to switch over to that television service. This viewer notification may use audio, video, or combinations thereof. In other embodiments, no user notification is performed, and digital media receiver 150 automatically tunes to, and switches the output signal to, the video program provided by the original service.

As mentioned earlier in connection with FIG. 2, in one embodiment, SegmentBoundaryNotify message 250 identifies the video program to which the boundary notification applies, and also includes the location of the segment boundary in that video program. This is illustrated in FIG. 4 as follows. Each video program 410 is composed of segments 470, divided by boundaries 480. Pointer 490 (within message 250) points to, or refers to, a particular location in video program 410B. As mentioned earlier, this segment boundary location in message 250 is received by digital media receiver 150 before the segment boundary occurs in the video program or in a corresponding media stream of the video program. Also, stream 410A is the currently tuned video program (as output by selector 420), not stream 410B, so that SegmentBoundaryNotify message 250 refers to a video program or television service other than the currently tuned channel or service (and thus, not the current video program).

In some embodiments, control channel 440 is bidirectional, though only downstream communication is shown in FIG. 4. Control channel 440 is depicted here as a logical entity, though a particular embodiment may not use a separate control channel but may instead multiplex control packets into the MPEG-2 transport stream. Control channel 440 may be broadly understood as encompassing many different mechanisms for conveying control information, even at different layers (e.g., including control data carried in MPEG-2 transport packets, carried in IPMG packets and carried in RTCP packets).

In an alternate embodiment, SegmentBoundaryNotify message 250 is provided with the video program as described above, such as in the SBI provided in the adaptation field of the MPEG-2 transport packet.

Figure 5:
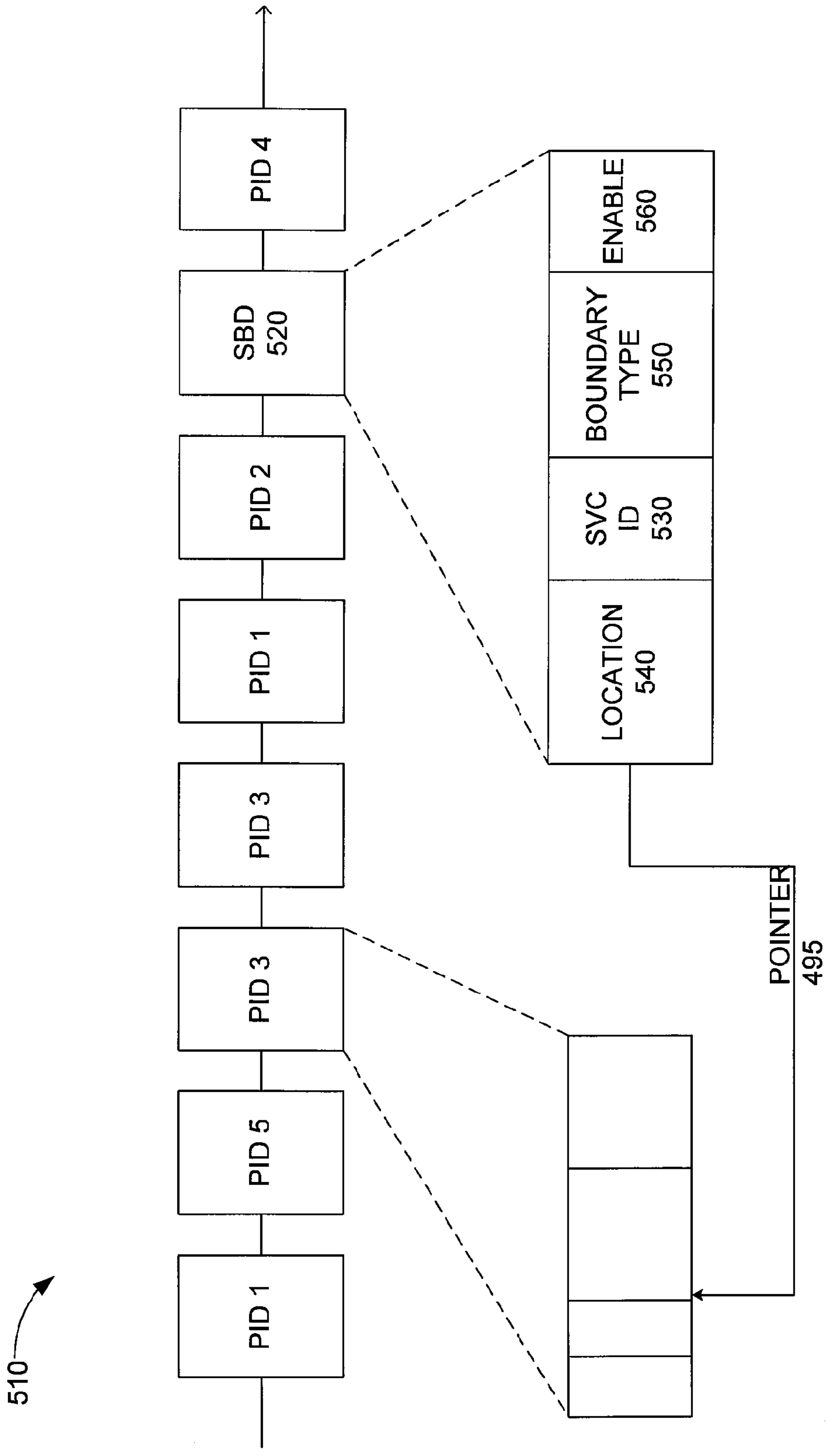
FIG. 5 illustrates how a SegmentBoundaryNotify message is conveyed in an MPEG-2 transport stream by some embodiments of the system from FIG. 1.

FIG. 5 illustrates how SegmentBoundaryNotify message 250 is conveyed in an MPEG-2 transport stream by some embodiments of system 100. Transport stream 510 carries (concurrently) two different services. Service #1 corresponds to transport stream packets having PIDs 1 and 2 (video and audio, respectively). Service #2 corresponds to transport stream packets having PIDs 3, 4, and 5 (video, audio, and data, respectively). Transport stream 510 also carries SegmentBoundaryDescriptor (SBD) 520, corresponding to generic SegmentBoundaryNotify message 250 of FIGS. 2-4. In some embodiments, SBD 520 is conveyed in the MPEG-2 transport stream packet's Adaptation Field, but other mechanisms for conveyance by the MPEG-2 transport stream are also contemplated.

In the example embodiment of FIG. 5, SBD 520 includes the following fields: the service to which the boundary notification applies (field 530); the location of the segment boundary in that service (data field 540), such as the value of a presentation time stamp (PTS); the type of transition of the segment boundary (field 550); and an enablement flag (field 560). One embodiment does not include the type of segment boundary and the enablement flag. As described above, Segment boundary types 550 may include different types of transitions. For instance, they may include: a transition from a first video program to a second video program in the a particular television service; a transition from a portion of a video program to an advertisement (or vice versa); the start of a certain chapter of a video program; the score highlights segment of sports service; an unscheduled boundary such as an update of the scores or highlights of other games during a football game or the start of the second half of a game; a splicing or concatenation event in a video program, video stream, audio stream, or any combination thereof; a type of splicing cue included in the video program's transport layer; a property in the video stream such as a random access point; or in an MPEG-4 AVC encoded video stream, an end of stream NAL unit, or an IDR picture.

Digital media receiver 150 may not process a segment boundary notification, depending on enablement flag 560. Thus, a digital media receiver 150 may request notification when a program resumes from an advertisement, but network operators can disable this functionality by providing a corresponding value for the enablement flag 560. The flag can be a global on/off, or specific to a boundary type (e.g., flag 560 is a bit mask). In yet another embodiment, returning to the first service upon termination of an advertisement is allowed only when the advertisements are presented in a second service that are transmitted concurrently with the advertisements in the first service.

In an alternate embodiment, as described above, segment boundary notifications are encrypted and may be decrypted and processed only by an authorized digital media receiver 150.

Figure 6:
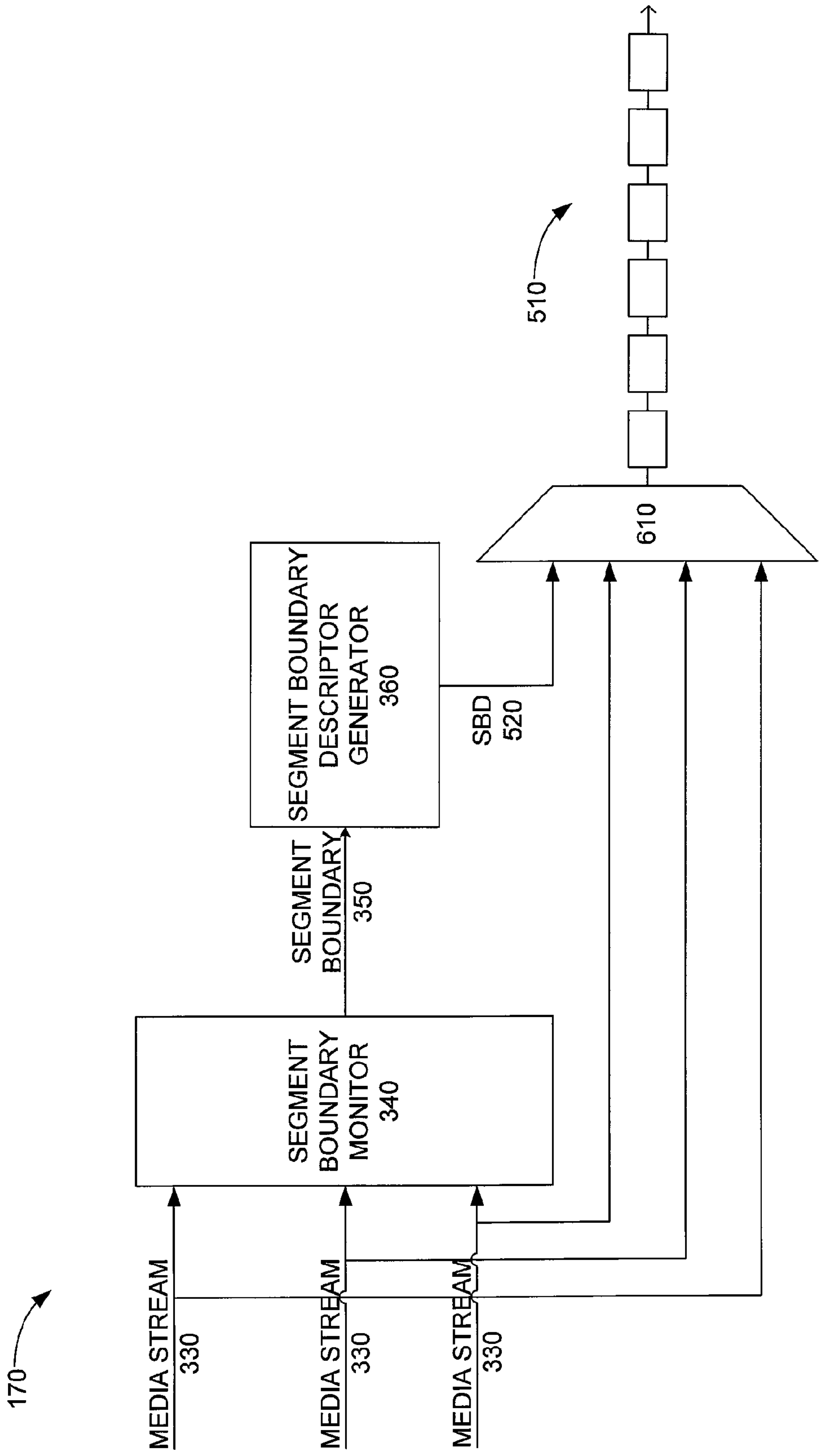
FIG. 6 is another block diagram of selected components of the video switch from FIG. 1, in an embodiment which generates an MPEG-2 transport stream.

FIG. 6 is another block diagram of selected components of video switch 130 in an embodiment which generates an MPEG-2 transport stream. As described earlier in connection with FIG. 3, video programs of one or more multiplexed media programs, shown as media streams 330, are received from various media sources and processed by segment boundary monitor 340. If segment boundary monitor 340 detects a segment boundary 350 in a stream-of-interest (i.e., a video program of interest), SBD generator 360 produces an SBD 520 (see FIG. 5), which is provided to MPEG-2 encapsulator/multiplexer 610. Encapsulator/multiplexer 610 wraps SBD 520 in one or more MPEG-2 transport stream (TS) packets, then multiplexes those private data packets or "control channel" packets in with MPEG-TS packets which encapsulate streams 330, along with timing information (e.g., program clock reference and system clock reference). The result is transport stream 510 (described earlier in connection with FIG. 5, which is conveyed over network 120 to digital media receiver 150 (see FIG. 1).

In an alternate embodiment, the SBD generator 360 produces an SBD 520 that is included in the SBNM provided in the adaptation field of an MPEG-2 transport packet that carries the video stream of the corresponding video program, as described above. Location data field (LDF) 540 provides a value N as described previously. In an alternate embodiment, LDF corresponds to the presentation time stamp (PTS) of the picture, frame or field coincident with the start of the second segment that immediately follows the end of the first segment in a boundary. The PTS of a picture is found in the header of the PES packet containing the start of the picture, frame, or field.

Figure 7:
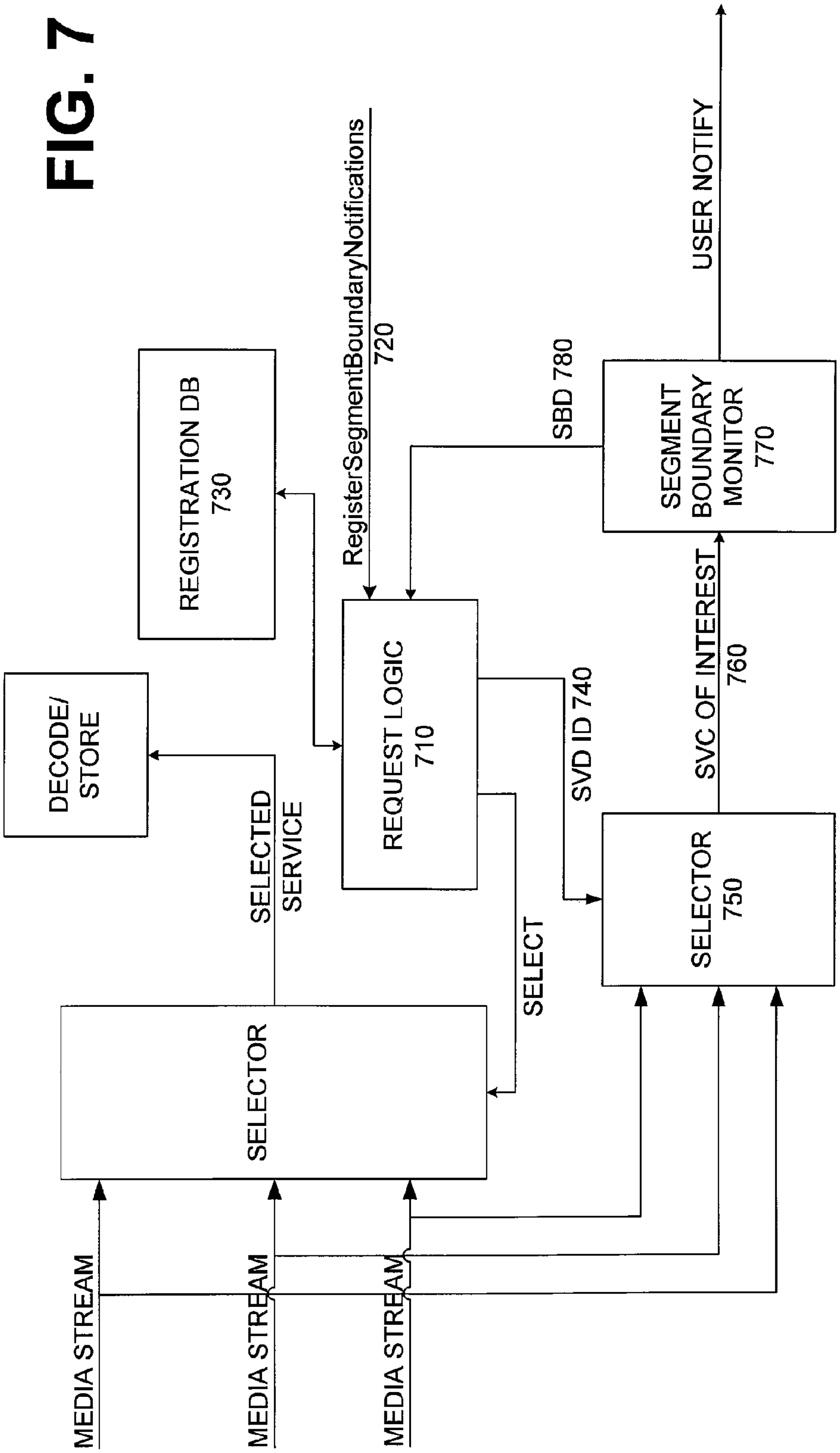
FIG. 7 is a block diagram of another embodiment of the digital media receiver from FIG. 1, in which detection of program segment boundaries is performed by a dual-tuner receiver.

FIG. 7 is a block diagram of another embodiment of digital media receiver 150, in which detection of program segment boundaries is performed by a dual-tuner digital media receiver 150 rather than at video switch 130. Segment boundary request logic 710 receives a request (720) to register for segment boundary notifications for a particular television service, and stores the service identifier in a registration database 730. This service identifier is also provided (740) to a selector 750. Multiple video programs with one or more multiplexed media streams received at digital media receiver 150 are provided to selector 750, which selects for its single output (760) the particular service-of-interest, and provides the video stream of the video program corresponding to this service to segment boundary monitor 770. Segment boundary monitor 770 examines the video stream for segment boundary notifications to identify segment boundaries. When a segment boundary is detected or identified, the segment boundary information (e.g., including the segment boundary descriptor 780) is provided by monitor 770 to request logic 710. Logic 710 notifies the viewer and/or instructs a second selector 790 to switch to the service-of-interest. In this dual-tuner embodiment, digital media receiver 150 may use the first tuner to receive and process segment boundary notifications in the background, while the second tuner is used to view or "surf" other channels or TV services.

In one embodiment, service boundary notifications are provided by segment boundary notification server 170 without requests from a digital media receiver 150. Digital media receivers 150 are authorized to receive and process service boundary notifications as described previously, e.g., by encrypting the SBNMs or by other means.

Figure 8:
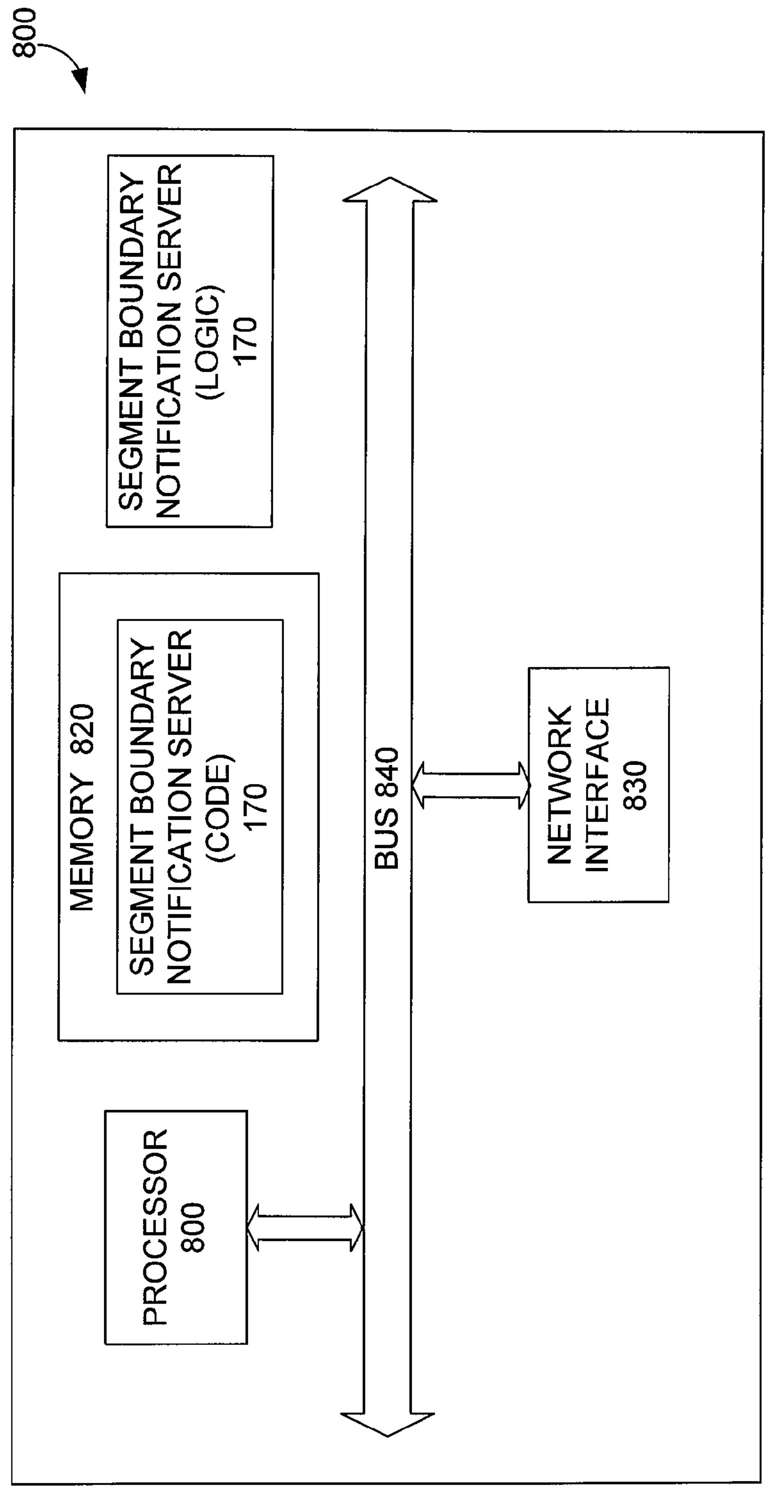
FIG. 8 is a block diagram of a general purpose computer implementing some embodiments of the server boundary notification server from FIG. 1.

FIG. 8 is a block diagram of one embodiment of a general purpose computer 800 that can be used to implement segment boundary notification server module 170. Computer 800 contains a number of components that are well known in the computer arts, including a processor 810, memory 820, and a network interface 830. Some embodiments also include a storage device 840 (e.g., non-volatile memory or a disk drive). These components are coupled via a bus 850. Omitted from FIG. 8 are a number of conventional components that are unnecessary to explain the operation of computer 800.

Figure 9:
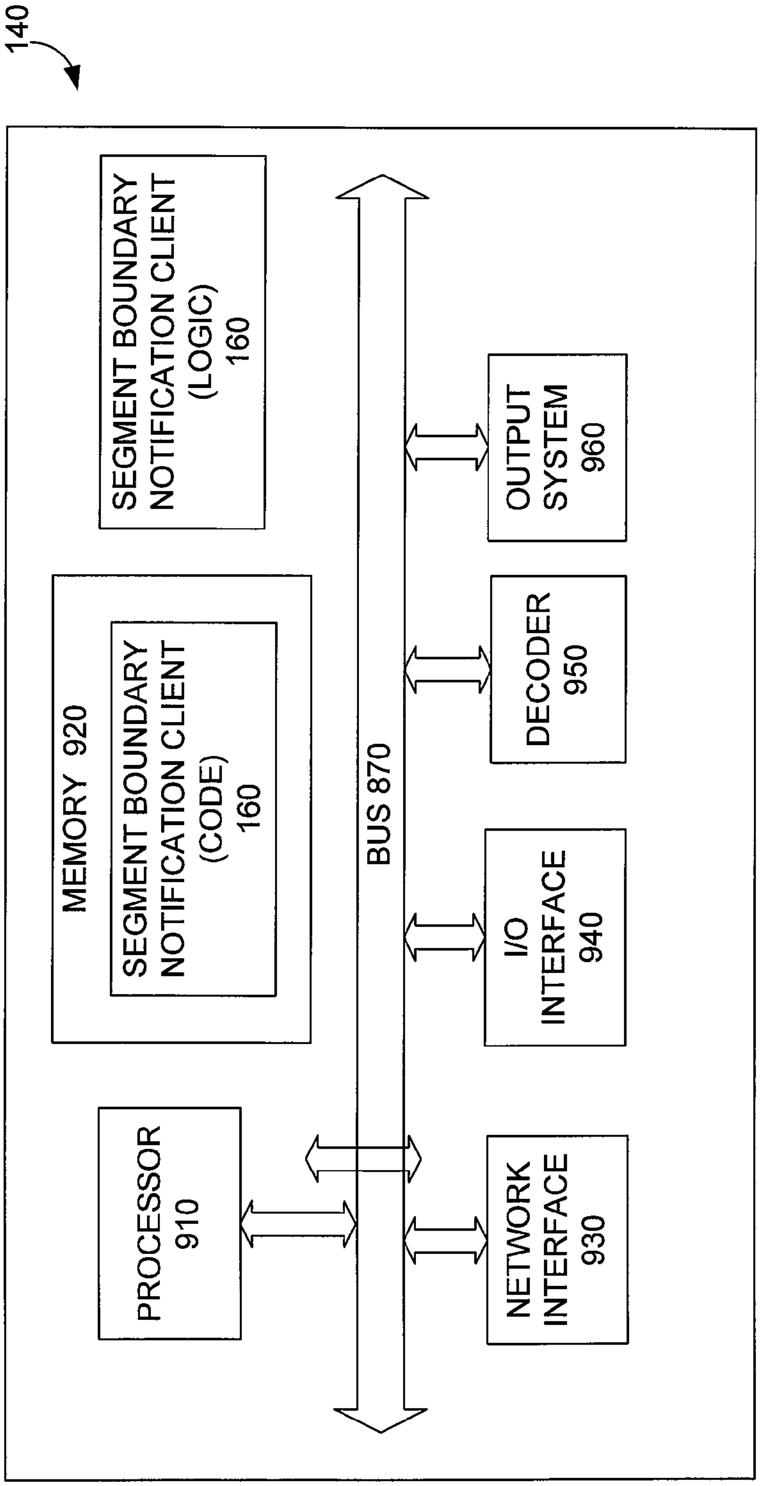
FIG. 9 is another block diagram of a general purpose computer implementing some embodiments of the server boundary notification server from FIG. 1.

FIG. 9 is a block diagram of one embodiment of digital media receiver 150. Digital media receiver 150 contains a number of components that are well known in the computer arts, including a processor 910, memory 920, a network interface 930, a peripheral input output (I/O) interface 940, a decoder 950, and an output subsystem 960. Some embodiments also include a storage device 970 (e.g., non-volatile memory or a disk drive). These components are coupled via a bus 990. Omitted from FIG. 9 are a number of conventional components that are unnecessary to explain the operation of digital media receiver 150.

Peripheral I/O interface 940 provides input and output signals, for example, user inputs from a remote control or front panel buttons or a keyboard, and outputs such as LEDs or LCD on the front panel. Network interface 930 receives video programs. Decoder 950 converts an incoming video program into decoded video pictures. In some embodiments, decoder 950 also handles conversion of audio data carried within, or along with, the video program stream, into a stream of decoded audio frames. Output subsystem 960 converts the decoded video pictures into a video signal for display by a computer monitor or a television and converts the decoded audio frames into an audio signal for play over speakers.

As described above, digital media receiver 150 receives video programs via network interface 930. In some embodiments, this is a local area network (LAN) interface or a wide area network (WAN) interface such as the Internet. In other embodiments, network interface 930 interfaces to a radio frequency (RF) network, and in such embodiments digital media receiver 150 may include a tuner/demodulator (not shown) which processes digital video programs received over the RF network.

As shown in FIGS. 8 and 9, segment boundary notification client 160 and/or segment boundary notification server module 170 may be implemented in hardware logic, or may reside in memory as instructions executable by a processor. Hardware implementations include, but are not limited to, a programmable logic device (PLD), a programmable gate array (PGA), a field programmable gate array (FPGA), an application-specific integrated circuit (ASIC), a system on chip (SoC), and a system in package (SiP). Furthermore, client 160 and/or server 170 may be implemented as a combination of hardware logic and processor-executable instructions (software).

Client 160 and/or server 170 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality is partitioned among components in some embodiments of segment boundary notification client 160 and/or server 170 disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of segment boundary notification. Alternatively, these diagrams may be viewed as depicting actions of an example of methods implemented by segment boundary notification client 160 and/or server 170. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method performed in a digital media receiver, the method comprising:

registering for notification of segment boundary events associated with a first service provided to the digital media receiver;

while tuned to a second service different than the first service, receiving a first notification of a first segment boundary event, wherein the first segment boundary is conveyed in a message in a transport layer corresponding to the first service and wherein the first segment boundary includes information corresponding to a first transition type from plural types of transitions, wherein the first transition type is contained in a transition type data field, wherein the first transition type corresponds to the type of transition being notified by the first segment boundary notification; and determining whether the first notification is authorized;

responsive to the determination that the first notification is authorized, processing the first notification; and receiving a second notification of a second segment boundary event, wherein the second segment boundary is conveyed in a message in the transport layer corresponding to the first service and wherein the second segment boundary includes information corresponding to a second transition type from plural types of transitions, wherein the second transition type is contained in a transition type data field, wherein the second transition type corresponds to a type of transition different that the type of transition notified by the first segment boundary notification.

2. The method of claim 1, wherein the processing the notification comprises tuning to the first service.

3. The method of claim 1, wherein the received notification is encrypted using a key, and determining whether the notification is authorized comprises determining whether the key is present in the digital media receiver.

4. The method of claim 1, wherein the received notification is encrypted using a key, and determining whether the notification is authorized comprises determining whether the key was received by the digital media receiver during an authorization procedure.

5. The method of claim 1, further comprising:

receiving, from a user, an instruction to register for the notification.

6. A digital media receiver comprising:

logic configured to register for notification of segment boundary events associated with a first service provided to the digital media receiver;

logic configured to receive a notification of a first one of the segment boundary events while tuned to a second service different than the first service, wherein the first segment boundary is conveyed in a message in a transport layer corresponding to the first service and wherein the first segment boundary includes information corresponding to a first transition type from plural types of transitions, wherein the first transition type is contained in a transition type data field, wherein the first transition type corresponds to the type of transition being notified by the first segment boundary notification;

logic configured to determine whether the notification is authorized;

logic configured to process the notification, responsive to the determination that the notification is authorized, wherein the logic configured to process the notification comprises logic configured to tune to the first service; and logic configured to receive a notification of a second one of the segment boundary events while tuned to the second service different than the first service, wherein the second segment boundary is conveyed in the message in a transport layer corresponding to the first service and wherein the second segment boundary includes information corresponding to a second transition type from plural types of transitions different from the first transition type, wherein the second transition type is contained in a transition type data field, wherein the second transition type corresponds to the type of transition being notified by the second segment boundary notification.

7. The digital media receiver of claim 6, wherein the received notification is encrypted using a key, and logic configured to determine whether the notification is authorized comprises logic configured to determine whether the key is present in the digital media receiver.

8. The digital media receiver of claim 6, wherein the received notification is encrypted using a key, and logic configured to determine whether the notification is authorized comprises logic configured to determine whether the key was received by the digital media receiver during an authorization procedure.

9. The digital media receiver of claim 6, wherein the segment boundary is a scheduled boundary.

10. The digital media receiver of claim 6, wherein the segment boundary is an unscheduled boundary.

11. A digital media receiver comprising:

memory; and a processor configured by instructions retrieved from the memory to:

receive, during an authorization process, a key associated with segment boundary event notification;

register for notification of segment boundary events associated with a first one of the subset of services;

receive an encrypted notification of a first one of the segment boundary events while the digital media receiver is tuned to a second one of the subset of services, the second one being different than the first one, wherein the first segment boundary is conveyed in message in a transport layer corresponding to the first one of the subset of services and wherein the first segment boundary includes information corresponding to a first particular transition type from plural types of transitions, wherein the first transition type is contained in a transition type data field, wherein the first transition type corresponds to the type of transition being notified by the segment boundary notification;

decrypt the encrypted notification using the received key;

process the decrypted notification; and receive an encrypted notification of a second one of the segment boundary events while the digital media receiver is tuned to a second one of the subset of services, the second one being different than the first one, wherein the second segment boundary is conveyed in message in a transport layer corresponding to the first one of the subset of services and wherein the second segment boundary includes information corresponding to a second particular transition type from plural types of transitions different than the first particular transition type, wherein the second transition type is contained in a transition type data field, wherein the second transition type corresponds to the type of transition being notified by the segment boundary notification.

12. The digital media receiver of claim 11, wherein the key is associated with segment boundary event notification for only a subset of a complete set of services available to the digital media receiver.

13. The digital media receiver of claim 11, wherein the key is associated with segment boundary event notification for only a subset of a complete set of services available to the digital media receiver, the subset being premium services for which a viewer pays an extra fee.

14. The digital media receiver of claim 11, wherein the key is associated with segment boundary event notification for only a subset of a complete set of services available to the digital media receiver, the subset being services for which a viewer does not pay an extra fee.

15. The digital media receiver of claim 11, wherein the key is associated with segment boundary event notification for only a subset of a complete set of services available to the digital media receiver, and the processor is further configured to:

determine whether the received encrypted notification corresponds to one of the services in the subset before decrypting the encrypted notification.

16. The digital media receiver of claim 11, wherein the key is associated with segment boundary event notification for only a subset of types of segment boundary event notifications available to the digital media receiver, and the processor is further configured to:

determine whether the received encrypted notification corresponds to one of the types in the subset before decrypting the encrypted notification.

17. The digital media receiver of claim 11, wherein the processor is further configured to process the decrypted notification by causing the digital media receiver to tune to the first service.

* * * * *